C. L. JANTZ.
CLOTHES WRINGER AND MANGLE.
APPLICATION FILED SEPT. 20, 1916.
1,260,904. Patented Mar. 26, 1918.
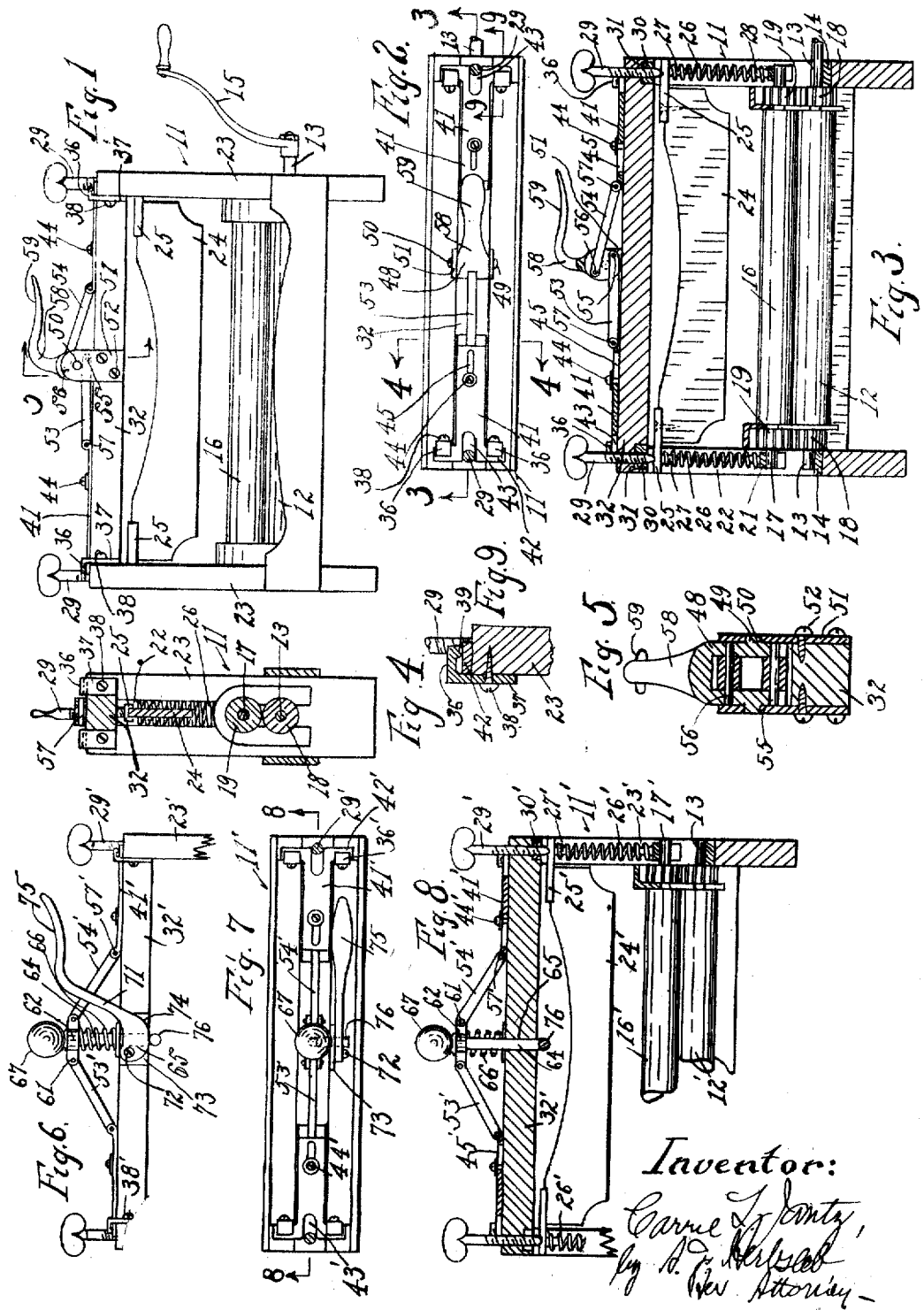
Inventor:
Carrie L. Jantz

UNITED STATES PATENT OFFICE.

CARRIE L. JANTZ, OF WYOMING, OHIO.

CLOTHES WRINGER AND MANGLE.

1,260,904.   Specification of Letters Patent.   Patented Mar. 26, 1918.

Application filed September 20, 1916. Serial No. 121,181.

*To all whom it may concern:*

Be it known that I, CARRIE L. JANTZ, a citizen of the United States, residing at Wyoming, in the county of Hamilton and State of Ohio, have invented certain new and useful Improvements in Clothes Wringers and Mangles, of which the following is a specification.

My invention relates to clothes wringers and mangles, and has for its object the provision of means whereby release of pressure acting to force the rolls together may be instantly obtained by a movement whereby the operator can exert instant and great force in case the fingers of the operator or any other object becomes unduly or accidentally caught between the rolls, whereby reverse movement of the rolls to release the fingers or object, which would add to the injury, is avoided.

The invention consists in a novel releasing mechanism for the purposes mentioned, and in novel arrangements and combination of parts whereby the purposes stated are obtained.

The invention will be further readily understood from the following description and claims, and from the drawing, in which latter my invention is exemplified as applied to a clothes wringer.

In the drawings:

Figure 1 represents a side elevation of a wringer embodying my invention.

Fig. 2 is a plan view of the same, with the upper ends of the adjusting screws broken away.

Fig. 3 is a vertical longitudinal section taken on the line 3—3 of Fig. 2.

Fig. 4 is a cross-section taken on the line 4—4 of Fig. 2.

Fig. 5 is a cross-section taken on the irregular line 5—5 of Fig. 1.

Fig. 6 is a side elevation of the upper portion of the wringer showing a modification of my improved device.

Fig. 7 is a plan view of the same with the upper ends of the adjusting screws broken away.

Fig. 8 is a vertical longitudinal section of the same, taken on the line 8—8 of Fig. 7, and partly broken away; and, Fig. 9 is a detail view, taken in section on the line 9—9 of Fig. 2.

11 represents the frame of the wringer which has a lower roll 12 therein. The roll is fixed to a shaft 13 rotatable in bearings 14, a suitable turning device, exemplified as a handle 15, being fixed to the shaft. The handle shows a manual turning means, although it is obvious that power driven operating means may be employed. An upper roll 16 coacts with the lower roll 1? and has a shaft 17 extending therefrom. Gears 18, 19, are respectively rigid with the rolls 12 and 16 and communicate motion from the former to the latter.

The shaft 17 is journaled in bearings 21 arranged to slide up and down in slots 22 between the end-stiles 23 of the main frame. A follow-bar 24 has extensions 25 rigid thereon which extend into the slots 22. Springs 26 are located in the slots 22 between the extensions and the bearings 21, the springs being shown as helical springs received over projections 27 depending from the extensions and projections 28 extending upwardly from the bearings 21.

Adjusting screws 29 are threaded in nuts 30 received and held against turning in recesses 31 in the cross-girt 32, which forms the upper cross-member of the main frame and is releasably received at its respective ends between the end-stiles 23. The lower ends of the adjusting screws 29, which are shown as thumb-screws, bear upon the extensions 25, the adjustment of the screws 29 acting to adjust the springs 26 and the consequent pressure exerted between the rolls 12, 16.

It has been found in devices of this character, that the fingers of the operator or other objects which are liable to be injured by the pressure, will accidentally be received between the rolls. Additional injury will accrue to the fingers or objects if the attempt were made to reverse the direction of rotation of the rolls and thereby release the fingers or objects. It is furthermore desirable to obtain the release of the fingers or objects as quickly as possible, and to enable this release to be accomplished by the operator of the machine, as machines of this character are very often operated without the presence of anyone except the operator.

I have provided novel means whereby this release may be instantly and effectively obtained by a movement of the operator in such manner that great force may be applied in a direction which will increase the muscular force by the addition of the weight of the operator, by the operator bearing upon the releasing member downward, and further, whereby the force applied may be multiplied at the point of release.

Referring to Figs. 1 to 5 inclusive, I have provided the frame with lips 36 which extend laterally and outwardly at the respective ends of the machine, being formed on metal clips 37 secured to the inner faces of the end-stiles 23, as by a screw 38, the clips extending upwardly and the lips extending outwardly and laterally above the outer ends of said end-stiles. The outer ends of the lips are preferably formed with knobs 39.

Slides 41 are arranged to slide along the upper face of the cross-girt 32 and project in opposite directions, the outer ends of the slides being provided with tongues 42 which are received under the lips 36, for forming a latch. The ends of the slides are bifurcated by means of end slots 43, through which the adjusting screws 29 extend, the tongues extending from the respective sides of said slots and the walls of said slots forming guiding means for the endwise movements of the slides. Screws 44 are received through slots 45 adjacent to the inner ends of said slides and are screwed into the cross-girt 32 for guiding the inner ends of said slides.

A crank-block 48, shown in the form of a fork, has gudgeons 49 extending outwardly from the respective tines of the fork into bearings 50 on bearing-plates 51 secured to the respective front and rear faces of the cross-girt 32, as by means of screws 52. Links 53, 54, connect the crank-block with the respective slides 41. The links are articulated eccentrically to the crank-block by the crank-pins 55, 56, and are articulated to the slides by means of the articulations 57.

The crank-block has an arm 58 extending upwardly and laterally therefrom. The outer end of this arm has a depressible part 59 thereon, upon which the operator may bear downwardly with his hand or arm for turning the crank-block and moving the slides 41 in opposite directions, whereby the tongues 42 are caused to move from under the lips 36, thereby releasing the connection between the cross-girt 32 and the end-stiles, whereby the follow-bar 24 is released and permitted to move upwardly for releasing the pressure upon the springs, the release of the pressure upon the springs removing the pressure upon the rolls, so that the fingers of the operator or other foreign part between the rolls may be withdrawn without further injury. The presence of the knobs 39 acting on the tongues serves to reduce friction and to aid in easy movement of the slides.

I have in Figs. 6 to 8 inclusive, shown a modification in which similar parts are designated by similar but primed reference numerals. In this modification the links 53', 54' have articulations 61 with a cross-head 62, the stem 64 of which slides axially in a bearing 65 in the cross-girt 32'. A spring 66 about the stem between the cross-girt and the cross-head acts normally to raise the cross-head and to maintain the tongues 42' under the lips 36'. The cross-head is provided with a striker-knob 67.

A lever 71 is pivoted to a pin 72 on a pivot-plate 73 secured to the cross-girt. It has a cam-face 74 forming an eccentric, and an upwardly and laterally projecting arm, at the outer end of which there is a depressing part 75, by means of which the lever may be readily depressed for moving the cam-face or eccentric downwardly. The stem 64 is at its lower end bent forwardly for forming a projection 76 against which the eccentric or cam-face 74 acts for depressing the stem and cross-head when the lever is depressed. Upon depression of the lever the cross-head 62 is moved downwardly, which acts on the links 53', 54' to separate the slides 41' and move the tongues 42' out from under the lips 36', thereby releasing the pressure upon the rolls and permitting ready withdrawal of anything which may be between the rolls. The cross-head 62 may also be depressed by striking upon the striker-knob 67.

In my improved device the release of pressure upon the rolls is quickly and instantly obtained by simple mechanism arranged in such manner that the force for releasing is applied to a manually operated part in a direction in which great force may be applied with comparatively little exertion and acts to instantly release the pressure upon the rolls.

The releasing parts are furthermore so constructed that the latch mechanism is all located within the width of the main frame so as to avoid laterally and forwardly and rearwardly projecting parts upon which clothes or the parts being operated upon might be liable to catch or which might tend to injure the operator.

Having thus fully described my invention, what I claim as new and desire to secure by Letters Patent, is:

1. In a device of the character described, the combination of a frame, rolls rotatable therein, resilient means exerting pressure between said rolls, and a releasing means for said resilient pressure means comprising a latch, a latch-operating part, a link articulated with said latch, said latch-operating part having eccentric and articulating connection with said link, and a manually operated part movable downwardly having operative connection with said latch-operating part for releasing said latch.

2. In a device of the character described, the combination of a frame, coacting rolls journaled therein, a releasable cross-girt for said frame, resilient means between said rolls and said cross-girt for exerting pressure between said rolls, and latching means between said frame and said cross-girt comprising a slide, a link articulated with said slide, and a manually operated depressible part having articulating connection with said link for releasing said latch.

3. In a device of the character described, the combination of a frame comprising ends having slots therein, a pair of superposed coacting rolls rotatable in said frame, bearings in said slots for the upper one of said rolls, a follower-bar provided with an extension in each of said slots, springs in said slots between said extensions and said bearings, a cross-girt, adjusting screws having threaded connections with said cross-girt arranged to press upon said follower-bar for adjusting said springs, an outwardly laterally extending lip secured to said frame, a slide-piece having slide-connection with said cross-girt and provided with a tongue received under said lip, a link articulated with said slide-piece, and a manually operated part movable downwardly and having articulating connection with said link for moving said slide-piece laterally outwardly whereby to move said tongue from under said lip to free said crossbar from connective relation with said frame at said lip.

4. In a device of the character described, the combination of a frame, coacting rolls journaled therein, a releasable cross-girt for said frame, resilient means between said rolls and said cross-girt for exerting pressure between said rolls, laterally outwardly extending lips secured to said frame in spaced relation therewith, a slide-bar having slide-connection with said cross-girt and provided with tongues located in said space between said first-named lips and said frame, a manually operated part, and a link between said manually operated part and said slide-bar for moving said tongues from under said lips.

5. In a device of the character described, the combination of a frame comprising a pair of end-stiles having a slot between them at each end of said frame, a cross-girt received in said slots, clips secured to the inner faces of said end-stiles and provided with lips projecting outwardly above and spaced from the upper ends of said end-stiles, coacting rolls, shafts therefor, bearings for said shafts in said slots, springs in said slots between said cross-girt and said bearings, endwise movable slides slidable on said cross-girt and provided with tongues received between said lips and the upper ends of said end-stiles, links articulated with said slides and a manually operated part movable downwardly having articulating connection with said links for moving said slides endwise outwardly from under said lips, whereby the pressure between said rolls is relieved.

6. In a device of the character described, the combination of a frame comprising a pair of end-stiles having a slot between them at each end of said frame, a cross-girt received in said slots, coacting rolls, springs in said slots between said cross-girt and said rolls, adjusting screws in the ends of said cross-girt coacting with said springs, clips secured to the inner faces of said end-stiles and provided with lips projecting outwardly above and spaced from the upper ends of said end-stiles, endwise movable slides having slide-connection with said cross-girt and provided with slots through which said adjusting screws are received, said slides at the sides of said last-named slots provided with laterally extending tongues received in said spaces between said lips and the upper ends of said end-stiles, links articulated with said slides, and a manually operated part having articulation with said links for moving said slides endwise outwardly and said tongues thereon from under said lips, whereby the pressure between said rolls is relieved.

In testimony whereof, I have hereunto signed my name in the presence of two subscribing witnesses.

CARRIE L. JANTZ.

Witnesses:
 WM. A. STARK.
 GERTRUDE L. JANTZ.